Jan. 27, 1970   J. P. SKINNER   3,491,631
FOAM MATERIAL CUTTER
Filed July 20, 1967

INVENTOR
Jerald Paul Skinner

BY Schmidt, Johnson, Hovey,
Williams & Bradley
ATTORNEYS.

United States Patent Office 3,491,631
Patented Jan. 27, 1970

3,491,631
FOAM MATERIAL CUTTER
Jerald Paul Skinner, Topeka, Kans., assignor to Independent General, Incorporated, Topeka, Kans., a corporation of Kansas
Filed July 20, 1967, Ser. No. 654,770
Int. Cl. B26d 1/06
U.S. Cl. 83—5     7 Claims

ABSTRACT OF THE DISCLOSURE

A pair of flexible, elongated, curved blades are supported at their ends for longitudinal reciprocation and are counterreciprocated by a drive mechanism. The blades are mounted for swinging movement in a direction to advance their cutting edges into a workpiece which may comprise a body of foam material or the like having yieldable or deformable characteristics.

---

Heretofore, difficulty has been encountered in cutting a smooth depression in foam materials by a simple cutting operation due to the yieldability and resilience of such materials. By way of an example, the subject of my co-pending application, Ser. No. 575,747, filed Aug. 29, 1966, now Patent No. 3,378,862 and entitled "Maternity Mattress," is directed to the provision of a foam mattress body having a cavity for receiving the expanded abdomen of a pregnant woman to provide increased comfort while sleeping. From the standpoints of both appearance and practicality in manufacture, the cavity must be smooth and uniform and means must be provided in the manufacture of the mattress to permit the cavity to be formed therein by a simple cutting operation performed on each individual mattress during fabrication thereof.

It is, therefore, the primary object of this invention to provide apparatus for severing a body of yieldable material while simultaneously preventing substantial deformation of such material so that a smooth and uniform depression may be cut therein.

As a corollary to the foregoing object, it is an important aim of the instant invention to provide apparatus as aforesaid in which the action of counterreciprocating cutting blades is employed to effect simultaneous severing of the material and prevention of deformation thereof during the cut.

Another important object of the invention is to provide such apparatus capable of shaping yieldable materials or cutting depressions therein of various configurations.

Additionally, it is an important object of this invention to provide apparatus as aforesaid in which the shapping or severing operation is performed without the necessity of deforming the material or feeding the latter into the cutting apparatus.

Figure 1:
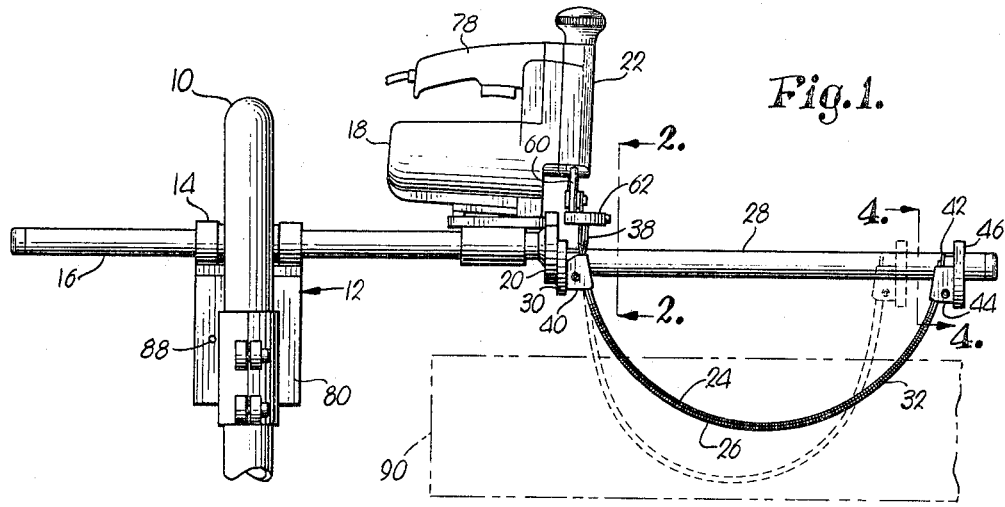
Figure 8:
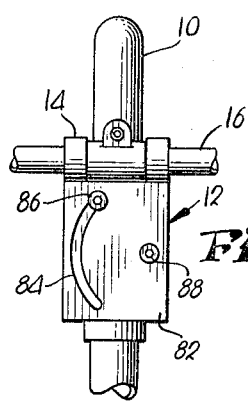
Figure 2:
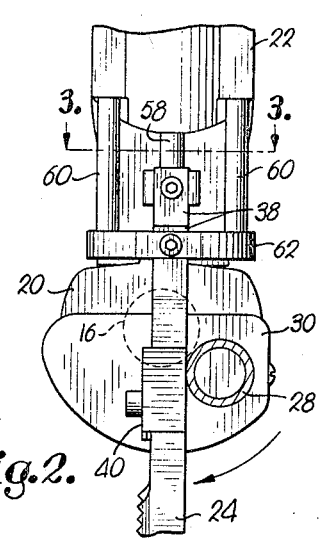
Figure 6:
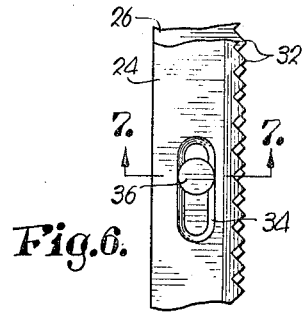
Figure 7:
Figure 9:
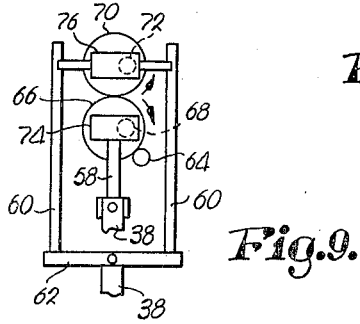
Figure 3:
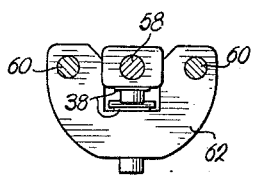
Figure 4:
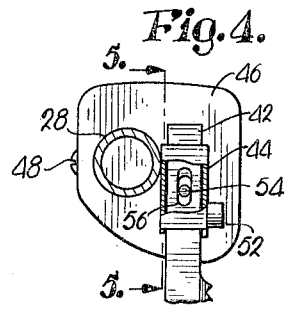
Figure 5:
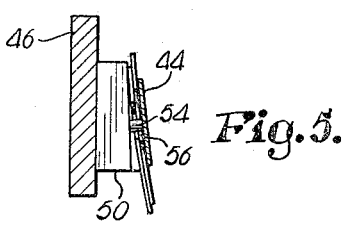

In the drawing:
FIG. 1 is a side elevational view of the apparatus;
FIG. 2 is an enlarged, cross-sectional view taken along line 2—2 of FIG. 1;
FIG. 3 is a cross-sectional view taken along line 3—3 of FIG. 2;
FIG. 4 is a cross-sectional view taken along line 4—4 of FIG. 1;
FIG. 5 is a vertical cross-sectional view taken along line 5—5 of FIG. 4;
FIG. 6 is an enlarged, fragmentary, detail view of the cutting blades;
FIG. 7 is a cross-sectional view taken along line 7—7 of FIG. 6;
FIG. 8 is a side elevational view of the opposite side of the standard and associated components illustrated in FIG. 1; and FIG. 9 is a diagrammatic view illustrating the drive transmission of the electric motor.

A standard 10 has a bracket 12 secured thereto provided with a barrel 14 which rotatably receives a tubular support member 16 upon which a prime mover 18 in the form of an electric motor is mounted. A generally semicircular plate 20 is secured to the right-hand end of member 16 beneath a drive transmission 22 through which motor 18 transmits driving power to a pair of elongated, flexible, curved blades 24 and 26. A bar 28 is normally horizontally disposed and is offset from the longitudinal axis of member 16, the left end (as viewed in FIG. 1) of bar 28 being rigid with a second, generally semicircular plate 30 secured to end plate 20.

Each of the blades 24 and 26 has a serrated, longitudinal cutting edge 32, blade 24 being disposed in overlying relationship to blade 26 with the cutting edges 32 of the blades in alignment (FIG. 6). Blade 24 is provided with a series of elongated slots, one such slot 34 being shown in FIG. 6 receiving a rivet 36 carried by the underlying blade 26.

The left or driven ends 38 of blades 24 and 26 are supported by a guide 40 attached to plate 30, while the right or free ends 42 of blades 24 and 26 are supported by a guide 44 attached to a mounting plate 46 which is apertured and slidably receives bar 28. Plate 46 is held at a desired position on bar 28 by a setscrew 48 (FIG. 4). Thus, the curvature of the blades is adjustable as illustrated by the solid and broken line representations of the blades, guide 44, and plate 46 in FIG. 1.

With reference to FIGS. 4 and 5, guide 44 is formed by an elongated, transversely U-shaped member which is slipped over a block 50 projecting from the inner face of plate 46. The guide member 44 is held in place by a screw 52, a pin 54 projecting from block 50 being received by a pair of slots 56 in the end portions 42 of blades 24 and 26.

Guide 40 is constructed in a manner similar to guide 44, with the exception that the slot and pin retaining means employed within guide 44 is not utilized in guide 40. Instead, the end 38 of blade 26 is secured to a reciprocable drive rod 58 and the end 38 of blade 24 is connected to a pair of reciprocable drive rods 60 by a U-shaped crosspiece 62.

The reciprocable rod 58 and the reciprocable drive assembly 60, 62 comprise the output components of transmission 22 illustrated diagrammatically in FIG. 9. A drive pinion 64 on the drive shaft (not shown) of motor 18 is in mesh with a first gear 66 which carries an eccentric cam 68, gear 66 being in mesh with a second gear 70 carrying an eccentric cam 72. A pair of followers 74 and 76 are in engagement with respective cams 68 and 72 and are, in turn coupled with rod 58 and rods 60. The directions of rotation of gears 66 and 70 are indicated by the arrows, illustrating that a counterreciprocating drive for the two blades 24 and 26 is provided.

A handle 78 on motor 18 allows an operator to swing blades 24 and 26 about the longitudinal axis of member 16, the latter being shown in a horizontal disposition. The bracket 12 is provided with a pair of plates 80 and 82, the latter having an arcuate slot 84 thereon receiving a stop (not shown) projecting from plate 80 and threaded to receive a nut 86. Plate 80 carries a pin 88 which mounts plate 82 for movement about a horizontal axis at right angles to the longitudinal axis of member 16. The plate 80 is secured to standard 10, while plate 82 carries the barrel 14; thus, upon loosening of nut 86, the cutting assembly may be swung to an upright position clearing the work area therebeneath.

In use, slide plate 46 is shifted along bar 28 to flex blades 24 and 26 to a degree depending upon the desired shape to be imparted to the cut. A body of material 90 is illustrated beneath bar 28, and the blades are shown at their maximum vertical penetration into body 90. To make a cut, the blades are initially swung to a position clearing the body 90, whereupon the operator, grasping handle 78, swings the reciprocating blades in a direction to advance the cutting edges 32 down into body 90 and thence upwardly therefrom at the completion of the arc. Assuming for purposes of illustration that body 90 represents a slab of foam mattress material as disclosed in my aforesaid co-pending application, it may be appreciated that the cut would form a cavity or depression in body 90 upon removal of the severed portion utilizable for the purposes discussed above.

Since the blades 24 and 26 are flexible and ends 42 thereof are freely supported except for the retaining pin 54 which still permits the requisite reciprocation, the blades are reciprocated along their respective longitudinal axes without substantial displacement therefrom or distortion during the cutting operation. It should be particularly noted that while one blade is moving in one longitudinal direction, the other blade is moving in the opposite longitudinal direction by virtue of the counter-reciprocating drive mechanism illustrated diagrammatically in FIG. 9 and discussed hereinabove. Thus, the serrated cutting edges 32 of the blades are always advancing in opposite directions to produce a net longitudinal force of zero; in other words, the tendency of the yieldable material to deform in the direction of longitudinal movement of one blade is exactly offset by the force exerted on the material by the oppositely moving blade. The cumulative effect, therefore, is to prevent distortion of the material so that a smooth and uniform cut may be made even though such cut is made along a curved line and follows an arcuate path through the material.

Having thus described the invention, what is claimed as new and desired to be secured by Letters Patent is:

1. Apparatus for severing a body of material to cut a depression therein, said apparatus comprising:
    a pair of elongated, longitudinally curved blades each having opposed ends and a longitudinal cutting edge;
    structure mounting said blades in juxtaposition for longitudinal reciprocation and for transverse movement in a material-cutting direction;
    said structure including a pair of spaced guides slidably supporting said ends of the blades for said longitudinal reciprocation of the blades, and means mounting said guides for swinging movement of said blades therewith in said material-cutting direction; and
    means coupled with said blades for reciprocating the latter and simultaneously shifting the blades in opposite longitudinal directions, whereby to sever material in the path of the blades as the latter are advanced in said material-cutting direction.

2. The invention of claim 1, said swinging movement being about an axis extending transversely of said material-cutting direction.

3. The invention of claim 1, said reciprocating means including a prime mover carried by said guide mounting means for driving said blades.

4. The invention of claim 3, said guide mounting means being provided with an elongated support member and means mounting said member for rotation about its longitudinal axis, whereby to define the axis of said swinging movement of said blades.

5. The invention of claim 1,
    said blades being flexible,
    said guide mounting means being provided with a bar extending between said guides, and shiftable means mounting one of said guides on said bar for movement therealong toward and away from the other of said guides, whereby to permit the spacing between said ends of the blades to be varied to, in turn, vary the curvature of the blades.

6. The invention of claim 5, said reciprocating means including a prime mover carried by said structure and having a pair of oppositely reciprocable output components connected to corresponding blades at the ends thereof supported by said other guide.

7. Apparatus for severing a body of material to cut a depression therein, said apparatus comprising:
    an elongated, longitudinally curved blade having a pair of opposed ends and a longitudinal cutting edge;
    structure mounting said blade for longitudinal reciprocation and for transverse movement in a material-cutting direction;
    said structure including a pair of spaced guides slidably supporting said ends of the blade for said longitudinal reciprocation thereof, and means mounting said guides for swinging movement of said blade therewith in said direction; and
    means coupled with said blade for reciprocating the latter, whereby to sever material in the path of the blade as the latter is advanced in said direction.

References Cited
UNITED STATES PATENTS

| | | | |
|---|---|---|---|
| 25,014 | 8/1859 | Hay | 144—33 |
| 97,310 | 11/1869 | Newman | 143—16 X |
| 498,713 | 5/1893 | Gordon. | |
| 2,814,193 | 7/1958 | Petrofsky | 143—16 X |
| 3,332,459 | 7/1967 | Gilmore | 83—5 X |

ANDREW R. JUHASZ, Primary Examiner

U.S. Cl. X.R.

83—564, 612; 143—16